(12) United States Patent
Petignaud

(10) Patent No.: US 11,243,401 B2
(45) Date of Patent: Feb. 8, 2022

(54) METHOD FOR CUSTOMIZING A HEAD MOUNTED DEVICE ADAPTED TO GENERATE A VIRTUAL IMAGE

(71) Applicant: Essilor International, Charenton-le-Pont (FR)

(72) Inventor: Cécile Petignaud, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 17/045,078

(22) PCT Filed: Apr. 4, 2019

(86) PCT No.: PCT/EP2019/058561
§ 371 (c)(1),
(2) Date: Oct. 2, 2020

(87) PCT Pub. No.: WO2019/193120
PCT Pub. Date: Oct. 10, 2019

(65) Prior Publication Data
US 2021/0165223 A1    Jun. 3, 2021

(30) Foreign Application Priority Data

Apr. 6, 2018  (EP) .................................... 18305410

(51) Int. Cl.
*G02B 27/01*  (2006.01)
*G02B 27/00*  (2006.01)

(52) U.S. Cl.
CPC ..... *G02B 27/0172* (2013.01); *G02B 27/0093* (2013.01); *G02B 27/0179* (2013.01);
(Continued)

(58) Field of Classification Search
CPC ............ G02B 27/0172; G02B 27/0093; G02B 27/0179; G02B 2027/0174; G02B 2027/0178; G02B 2027/0187
See application file for complete search history.

(56) References Cited

U.S. PATENT DOCUMENTS 9,555,589 B1    1/2017  Ambur et al.
9,557,568 B1    1/2017  Ouderkirk et al.
(Continued)

FOREIGN PATENT DOCUMENTS

WO    WO 201 5/027196 A1    2/2015
WO    WO 201 7/040875 A2    3/2017

OTHER PUBLICATIONS

International Search Report and Written Opinion dated Jul. 10, 2019 in PCT/EP2019/058561 filed on Apr. 4, 2019.

*Primary Examiner* — Dmitriy Bolotin
(74) *Attorney, Agent, or Firm* — Oblon, McClelland, Maier & Neustadt, L.L.P.

(57) ABSTRACT

A method for customizing a head mounted device adapted to generate a virtual image for a wearer, the method comprises: obtaining a 3D eye pupil position of the wearer in a reference frame and corresponding to a predetermined gaze direction, and customizing the head-mounted device based on the 3D eye pupil position so that the position of a focus area (EMB) at least partly coincides with the position of the eye pupil in the predetermined gaze direction, wherein customizing the head-mounted device comprises controlling a recording of a holographic mirror based on the 3D eye pupil position in the reference frame.

14 Claims, 4 Drawing Sheets

(52) U.S. Cl.
CPC ............... *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 9,581,744 B1 | 2/2017 | Yun et al. | |
| 9,581,827 B1 | 2/2017 | Wong et al. | |
| 2002/0041259 A1 | 4/2002 | Lewis et al. | |
| 2002/0167462 A1* | 11/2002 | Lewis | G06F 3/013 345/7 |
| 2010/0097580 A1 | 4/2010 | Yamamoto et al. | |
| 2012/0008482 A1* | 1/2012 | Bablumyan | G03H 1/04 369/103 |
| 2012/0280956 A1 | 11/2012 | Yamamoto et al. | |
| 2013/0322683 A1 | 12/2013 | Jacobs | |
| 2015/0055085 A1 | 2/2015 | Fonte et al. | |
| 2015/0055086 A1 | 2/2015 | Fonte et al. | |
| 2015/0154322 A1 | 6/2015 | Fonte et al. | |
| 2015/0154678 A1 | 6/2015 | Fonte et al. | |
| 2015/0154679 A1 | 6/2015 | Fonte et al. | |
| 2015/0160529 A1* | 6/2015 | Popovich | G02F 1/13342 359/200.8 |
| 2015/0212343 A1 | 7/2015 | Fonte et al. | |
| 2016/0062151 A1 | 3/2016 | Fonte et al. | |
| 2016/0062152 A1 | 3/2016 | Fonte et al. | |
| 2016/0238845 A1* | 8/2016 | Alexander | G02B 27/12 |
| 2017/0068030 A1 | 3/2017 | Ambur et al. | |
| 2017/0068096 A1 | 3/2017 | Ouderkirk et al. | |
| 2017/0068099 A1 | 3/2017 | Ouderkirk et al. | |
| 2017/0068100 A1 | 3/2017 | Ouderkirk et al. | |
| 2017/0068101 A1 | 3/2017 | Yun et al. | |
| 2017/0068104 A1 | 3/2017 | Ouderkirk et al. | |
| 2017/0068105 A1 | 3/2017 | Yun et al. | |
| 2017/0068121 A1 | 3/2017 | Fonte et al. | |
| 2017/0097449 A1 | 4/2017 | Ouderkirk et al. | |
| 2017/0097453 A1 | 4/2017 | Ambur et al. | |
| 2017/0097454 A1 | 4/2017 | Wong et al. | |
| 2017/0097508 A1 | 4/2017 | Yun et al. | |
| 2017/0146714 A1 | 5/2017 | Ambur et al. | |
| 2017/0269368 A1 | 9/2017 | Yun et al. | |
| 2017/0269385 A1 | 9/2017 | Fonte et al. | |
| 2018/0039004 A1 | 2/2018 | Yun et al. | |
| 2018/0059296 A1 | 3/2018 | Ouderkirk et al. | |
| 2018/0180784 A1 | 6/2018 | Ouderkirk et al. | |
| 2018/0180788 A1 | 6/2018 | Ambur et al. | |
| 2018/0196181 A1 | 7/2018 | Wong et al. | |
| 2018/0239149 A1 | 8/2018 | Yun et al. | |
| 2018/0267222 A1 | 9/2018 | Ambur et al. | |
| 2018/0267319 A1 | 9/2018 | Ouderkirk et al. | |
| 2018/0299704 A1 | 10/2018 | Fonte et al. | |
| 2018/0332275 A1* | 11/2018 | Gruhlke | G02B 27/0172 |
| 2018/0356640 A1 | 12/2018 | Yun et al. | |
| 2019/0018235 A1 | 1/2019 | Ouderkirk et al. | |
| 2019/0146246 A1 | 5/2019 | Fonte et al. | |
| 2019/0222830 A1* | 7/2019 | Edwin | G06F 3/167 |

* cited by examiner

METHOD FOR CUSTOMIZING A HEAD MOUNTED DEVICE ADAPTED TO GENERATE A VIRTUAL IMAGE

FIELD OF THE INVENTION

The invention relates to a method for customizing a head mounted device adapted to generate a virtual image for a wearer, to a device for same, and to a computer program product for same.

BACKGROUND OF THE INVENTION

The existing display optical equipment, especially those that enable a see-around or see-through vision are standard equipment. In other words, such devices provide very few, if any, possibility of adjustments. In particular the display device is adapted for an average user and does not adapt to a specific user.

In addition to this, even if the information displayed to the user appears on the same location for different equipment, a part of the virtual image may be not entirely visible to the user if the equipment is not customized according to the user, thus limiting the virtual field of view.

As for conventional optical equipment, in particular ophthalmic equipment, each individual user does not have the same visual experience when using a standard display optical device.

For example the information displayed to the user does not appear at the same location in the visual field for each user. Typically, an information that is to appear on the side of the visual field may, depending on the user, appear in the center of the visual field or even not appear in the visual field of the user.

Therefore, there is a need for a method for providing a display optical equipment that is better adapted to the user of such equipment.

SUMMARY OF THE INVENTION

To this end, the invention proposes a method for customizing a head mounted device adapted to generate a virtual image for a wearer, the method comprising:
  obtaining a 3D eye pupil position of the wearer in a reference frame and corresponding to a predetermined gaze direction, and
  customizing the head-mounted device based on the 3D eye pupil position so that the position of a focus area (EMB) at least partly coincides with the position of the eye pupil in the predetermined gaze direction,
wherein customizing the head-mounted device comprises controlling a recording of a holographic mirror based on the 3D eye pupil position in the reference frame.

Advantageously, the method allows customizing the head mounted device so that the virtual image is visible by the wearer independently of the face anatomy of the wearer, due to customizing the head-mounted device based on a provided 3D eye pupil position, thus ensuring correct focus of the virtual image through the pupil of the wearer.

Another potential advantage of the method is improving the comfort of the wearer due to obtaining the 3D eye pupil position, as notably in particular modes, the method allows customizing the head mounted device so that the virtual image is visible by the wearer independently of the wearing preferences of the wearer, or of the wearing conditions most suitable for a given activity or a given vision task. Moreover, the provided 3D eye pupil position corresponds to a specific predetermined gaze direction, which may be chosen by the wearer for maximum comfort.

According to further embodiments which can be considered alone or in any possible combination:
  the 3D eye pupil position is obtained in a reference frame linked to the head-mounted device; and/or
  the method further comprises, prior to obtaining the 3D eye pupil position, determining the 3D eye pupil position in a reference frame linked to the head-mounted device; and/or
  the customized head mounted device comprises a light source configured to emit a light beam and a reflective element configured to receive and redirect the light beam towards the focus area (EMB); and/or
  the reflective element comprises the holographic minor; and/or
  the head-mounted device comprises a scanning element configured to receive the light beam and to scan the received light beam towards the reflective element; and/or
  during customizing the head-mounted device, at least one of the light source, the scanning element and/or the reflective element is adapted based on the 3D eye pupil position in the reference frame; and/or
  during customizing the head-mounted device, the position and/or the orientation of at least one of the light source, the scanning element and the reflective element is adjusted based on the 3D eye pupil position in the reference frame; and/or
  during customizing the head-mounted device, the holographic mirror is recorded based on the 3D eye pupil position in the reference frame; and/or
  the method further comprises obtaining at least one fitting parameter, and the 3D eye pupil position is determined based on the at least one fitting parameter; and/or
  the method further comprises obtaining at least one centering parameter, and the 3D eye pupil position is determined based on the at least one centering parameter; and/or
  the method further comprises, prior to customizing the head mounted device, obtaining at least one configuration parameter value of the head-mounted device related to the position of the focus area in a reference frame; and/or
  during customizing the head-mounted device, the at least one configuration parameter is customized and updated based on the obtained 3D eye pupil position; and/or
  obtaining a 3D eye pupil position and customizing the head-mounted device based on the obtained 3D eye pupil position are repeated over time; and/or
  the position of the focus area (EMB) comprises the position of a point; and/or
  the position of the focus area (EMB) comprises the position of a surface; and/or
  the position of the focus area (EMB) comprises the position of a volume; and/or
  the position of the eye pupil comprises the position of a point; and/or
  the position of the eye pupil comprises the position of a surface; and/or
  the head-mounted device comprises a frame; and/or
  the 3D eye pupil position is obtained in a reference frame linked to the frame of the head-mounted device; and/or
  the method further comprises, prior to obtaining the 3D eye pupil position, determining the 3D eye pupil position in a reference frame linked to the frame of the head-mounted device; and/or the method further comprises, after providing the head-mounted device, positioning the head-mounted device on the wearer; and/or the head-mounted device comprises a light source configured to emit a light beam and a scanning element configured to receive the light beam and to reflect the received light beam; and/or the head-mounted device comprises a reflective element configured to receive and redirect the light beam reflected by the scanning element toward the focus area (EMB); and/or during customizing the head-mounted device, a reflective element configured to receive and redirect the light beam reflected by the scanning element toward the focus area (EMB) is added to the head-mounted device.

The invention further relates to a method for customizing a head mounted device adapted to generate a virtual image for a wearer, the method comprising:

a head-mounted device providing step, during which a head-mounted device configured to direct a light beam towards a focus area (EMB) is provided, a 3D eye pupil position providing step, during which a 3D eye pupil position of the wearer is provided in a reference frame linked to the head-mounted device and corresponding to a predetermined gaze direction, and a head-mounted device customizing step, during which the head-mounted device is customized based on the 3D eye pupil position so that the position of the focus area (EMB) at least partly coincides with the position of the eye pupil in the predetermined gaze direction.

Advantageously, that method allows customizing the head mounted device so that the virtual image is visible by the wearer independently of the face anatomy of the wearer, due to the head-mounted device customizing step, during which the customization is performed based on a provided 3D eye pupil position, thus ensuring correct focus of the virtual image through the pupil of the wearer.

Another potential advantage of that method is improving the comfort of the wearer due to the 3D eye pupil position providing step, as notably in particular modes, the method allows customizing the head mounted device so that the virtual image is visible by the wearer independently of the wearing preferences of the wearer, or of the wearing conditions most suitable for a given activity or a given vision task. Moreover, the provided 3D eye pupil position corresponds to a specific predetermined gaze direction, which may be chosen by the wearer for maximum comfort.

According to further embodiments which can be considered alone or in any possible combination:

the position of the focus area (EMB) comprises the position of a point; and/or the position of the focus area (EMB) comprises the position of a surface; and/or the position of the focus area (EMB) comprises the position of a volume; and/or the position of the eye pupil comprises the position of a point; and/or the position of the eye pupil comprises the position of a surface; and/or the head-mounted device comprises a frame; and/or during the 3D eye pupil position providing step, the 3D eye pupil position is provided in a reference frame linked to the frame of the head-mounted device; and/or the method further comprises, prior to the 3D eye pupil position providing step, a 3D eye pupil position determining step during which the 3D eye pupil position is determined in a reference frame linked to the head-mounted device; and/or the method further comprises, after the head-mounted device providing step, a head-mounted device positioning step, during which the head-mounted device is positioned on the wearer; and/or the head-mounted device provided during the head-mounted device providing step comprises a light source configured to emit a light beam and a scanning element configured to receive the light beam and to reflect the received light beam; and/or the head-mounted device provided during the head-mounted device providing step comprises a reflective element configured to receive and redirect the light beam reflected by the scanning element toward the focus area (EMB); and/or during the head-mounted device customizing step, a reflective element configured to receive and redirect the light beam reflected by the scanning element toward the focus area (EMB) is added to the head-mounted device; and/or during the head-mounted device customizing step, at least one of the light source, the scanning element and/or the reflective element is adapted based on the 3D eye pupil position in the reference frame linked to the head mounted device; and/or during the head-mounted device customizing step, the position of at least one of the light source, the scanning element and/or the reflective element is adjusted based on the 3D eye pupil position in the reference frame linked to the head mounted device; and/or during the head-mounted device customizing step, the orientation of at least one of the light source, the scanning element and/or the reflective element is adjusted based on the 3D eye pupil position in the reference frame linked to the head mounted device; and/or the reflective element comprises a holographic mirror, and/or during the head-mounted device customizing step, the holographic mirror is recorded based on the 3D eye pupil position in the reference frame linked to the head mounted device; and/or the method further comprises a fitting parameter providing step, during which at least one fitting parameter is provided; and/or during the 3D eye pupil position providing step, the 3D eye pupil position is determined based on the at least one fitting parameter; and/or the method further comprises a centering parameter providing step, during which at least one centering parameter is provided; and/or during the 3D eye pupil position providing step, the 3D eye pupil position is determined based on the at least one centering parameter; and/or the method further comprises, prior to the head mounted device customizing step, a configuration parameter value providing step, during which at least one configuration parameter value of the head-mounted device related to the position of the focus area in a reference frame linked to the head-mounted device is provided; and/or during the head-mounted device customizing step, the at least one configuration parameter is customized and updated based on the provided 3D eye pupil position; and/or the 3D eye pupil position providing step and the head-mounted device customizing step are repeated over time.

The invention further relates to a device for determining the relative position of a head-mounted device configured to direct a light beam towards a focus area (EMB) and of an eye pupil of the wearer, the device comprising at least one position sensor, a memory and a processing unit, each communicating with one another, the at least one position sensor being adapted to determine position data comprising the 3D position of the eye pupil when the wearer wears the head-mounted device and the 3D position of at least part of the head-mounted device when the wearer wears the head-mounted device, the memory being adapted to store the position data determined by the at least one position sensor, and the processing unit being adapted for determining the 3D position of the eye pupil in a reference frame linked to the head-mounted device based on the position data stored on the memory.

According to further embodiments which can be considered alone or in any possible combination:

the head-mounted device comprises a light source configured to emit a light beam and a scanning element configured to receive the light beam and to reflect the received light beam; and/or the head-mounted device comprises a reflective element configured to receive and redirect the light beam reflected by the scanning element toward the focus area (EMB); and/or the device for determining the relative position of a head-mounted device and of an eye pupil of the wearer further comprises the head-mounted device.

According to a further aspect, the invention relates to a computer program product comprising one or more stored sequences of instructions that are accessible to a processor and which, when executed by the processor, causes the processor to carry out the steps of the method for customizing the head mounted device according to the invention.

The invention further relates to a computer readable medium carrying one or more sequences of instructions of the computer program product according to the invention.

Furthermore, the invention relates to a program which makes a computer execute at least the method for customizing the head mounted device of the invention.

The invention also relates to a computer-readable storage medium having a program recorded thereon; where the program makes the computer execute at least the method for customizing the head mounted device of the invention.

The invention further relates to a device comprising a processor adapted to store one or more sequence of instructions and to carry out at least one of the steps of the method according to the invention.

The invention further relates to a device for customizing a head mounted device adapted to generate a virtual image for a wearer, the device comprising at least a memory and at least one processing unit communicating with each other, the memory being adapted to store position data comprising a 3D position of at least one eye pupil when the wearer wears the head-mounted device and a 3D position of at least part of the head-mounted device when the wearer wears the head-mounted device, the processing unit(s) being adapted for determining a 3D eye pupil position of the wearer in a reference frame based on the position data stored on the memory, and the processing unit(s) being adapted for determining data for customizing the head mounted device based on the 3D eye pupil position of the wearer so that a position of a focus area (EMB) at least partly coincides with the 3D eye pupil position.

In advantageous embodiments, the processing unit(s) is/are configured for controlling a recording of a holographic mirror based on the 3D eye pupil position in the reference frame.

The invention further relates to a head-mounted device configured to direct a light beam towards a focus area (EMB), the head-mounted device comprising the abovementioned device.

The invention further relates to a computer program product comprising one or more stored sequences of instructions that are accessible to a processor and which, when executed by the processor, causes the processor to:

obtain a 3D eye pupil position of the wearer in a reference frame and corresponding to a predetermined gaze direction, and customize a head-mounted device based on the 3D eye pupil position of the wearer so that a position of a focus area (EMB) at least partly coincides with the 3D eye pupil position.

In advantageous embodiments, the one or more stored sequences of instructions, when executed by the processor, causes the processor to control a recording of a holographic mirror based on the 3D eye pupil position in the reference frame.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non-limiting embodiments of the invention will now be described with reference to the accompanying drawings wherein.

Elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF EMBODIMENTS

The invention relates to a method for customizing a head mounted device adapted to generate a virtual image for a wearer.

Figure 1:
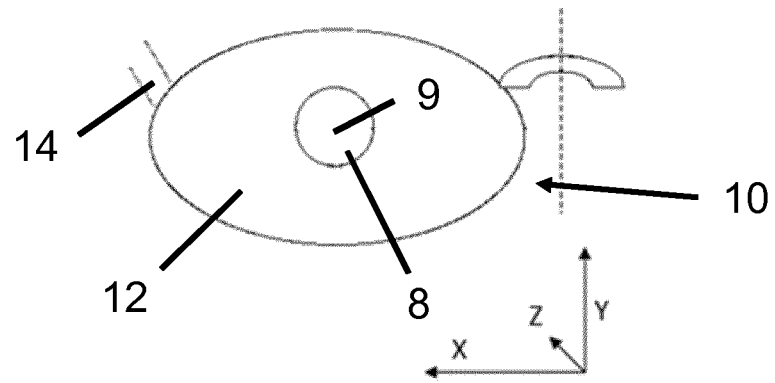
FIGS. 1, 2A and 2B are schematic front, side and top views of a worn head-mounted device customized according to a method according to an embodiment of the invention.
Figure 2A:
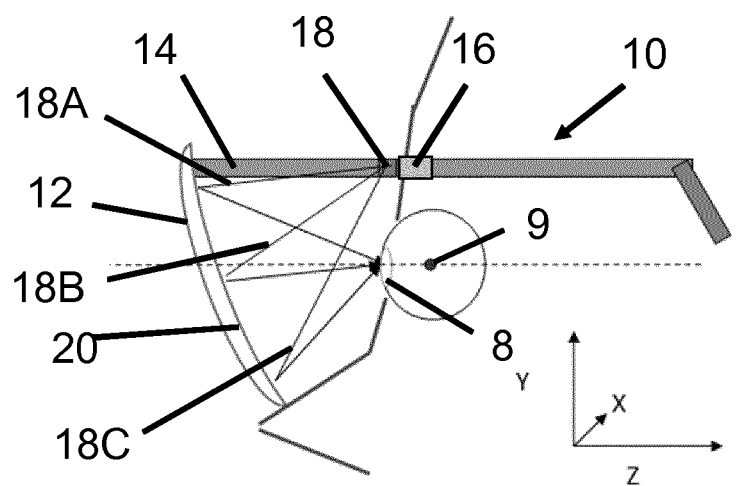
Figure 2B:
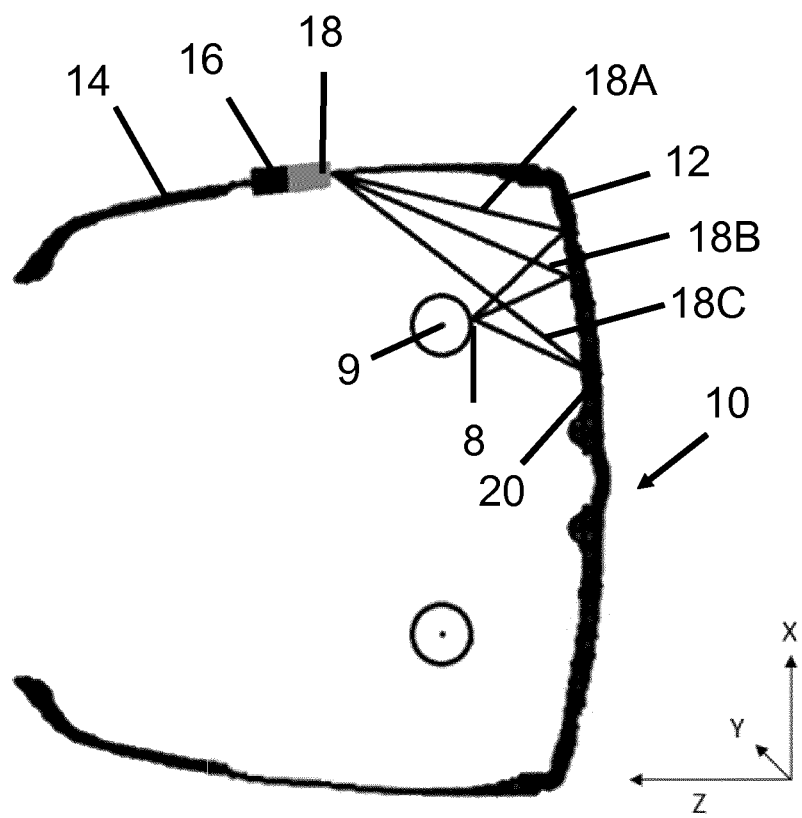

As illustrated on FIGS. 1, 2A and 2B, the method aims to customize a head mounted device 10 so that when the head mounted device 10 is worn by a wearer, the generated virtual image is focused through the pupil 8 of the wearer.

Figures 3A, 3B, 3C:
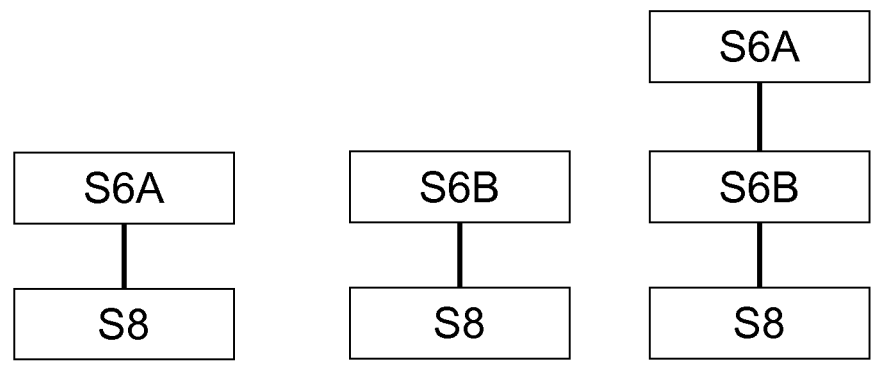
FIGS. 3A, 3B and 3C are flowcharts of different steps of a method for customizing a head mounted device according to the different embodiments of the invention.

As illustrated on FIGS. 3A, 3B and 3C, the method comprises:
  obtaining S6A and/or providing S6B the 3D eye pupil position, and
  customizing S8 a head-mounted device.

Obtaining S6A the 3D eye pupil position may comprise receiving the 3D eye pupil position.

The method may further comprise providing S1 a head-mounted device. Providing S1 the head-mounted device may be performed either prior to, or after, or simultaneously with obtaining S6A and/or providing S6B the 3D eye pupil position.

The relative position of the eye pupil 8 with respect to the head-mounted device 10 depends on the head-mounted device usage by the wearer, which may include face anatomy of the wearer, and/or wearing preferences of the wearer and/or wearing conditions corresponding to a specific vision task or activity of the wearer.

Advantageously, the method according to the disclosure allows customizing the head mounted device 10 to the usage of the wearer, based on obtaining S6A and/or providing S6B the 3D eye pupil position.

During providing S1 the head-mounted device, a head-mounted device 10 configured to direct a light beam towards a focus area (EMB) is provided.

The head-mounted device 10 may be an augmented reality eyewear or a virtual reality head-mounted device. The head-mounted device 10 may comprise one or more optical lenses 12, such as a spectacle lens adapted to a wearer, a plano lens, a single vision ophthalmic lens, a bifocal ophthalmic lens, a progressive ophthalmic lens. The head-mounted device 10 may comprise a frame 14 to which two spectacle lenses are attached.

The light beam comprises information intended to be displayed to the wearer.

The head mounted device 10 may comprise a light source 16, for example a switchable light source, configured to emit a light beam.

The head-mounted device 10 may comprise a scanning element 18 configured to receive the light beam and to scan the received light beam. The light source and/or the scanning element 18 may be attached to or integrated in the frame 14 of the head-mounted device 10. Scanning the received light beam may comprise reflecting and/or refracting of the received light beam.

The head-mounted device 10 may comprise a reflective element 20 configured to receive and redirect the light beam reflected by the light source and/or by the scanning element 18 towards the focus area (EMB). For example, the reflective element 20 may be embedded in an optical lens 12 of the head-mounted device 10.

As illustrated on FIG. 2, the light beam may follow different paths 18A, 18B, 18C, corresponding to different rays of the total beam scanned by the scanning element 18.

The reflective element 20 may comprise a passive holographic mirror. A holographic minor is defined as being recorded using a holography process. The mirror is used to redirect a light beam generated from an image source, so as to cause the visualization of the image by the wearer. The holographic mirror is not used to reconstruct a recorded holographic image (as is the case in traditional hologram viewing). Due to the recording, the mirror is imparted an optical function, that is able, where applicable to modify the wavefront of the light beam stemming from the image source, upon redirection by said mirror. This allows to correct the virtual vision of the wearer, because the optical lens 12 incorporating the holographic minor can modify the light beam that generates the image in the eye of the wearer.

The reflective element 20 may comprise an electro-active holographic mirror. The holographic mirror may comprise one or more areas of tunable optical properties, such as value of refractive index/indices, phase, reflectivity (value, angle, wavelengths or spectral curve), transmittance, etc. . . . . Advantageously, the optical properties of the head-mounted device 10 may be customized to the needs of the wearer.

The focus area (EMB) is related to the eye motion box, which is defined as the convergence spot of the light beam. In other words, the focus area may be represented as a 3D viewing cone in which the displayed information carried by the light beam may be viewed by a human eye. In the sense of the disclosure, the position of the focus area may be understood as the position of the whole 3D viewing cone, or of part of the 3D viewing cone, such as a 2D surface corresponding to a section of the 3D viewing cone orthogonal to the axis of the 3D viewing cone, or such as a point located on the axis of the 3D viewing cone.

Considering a set configuration of the head-mounted device 10, the position of the focus area is also set in a reference frame linked to the head-mounted device 10.

During obtaining S6A and/or providing S6B the 3D eye pupil position, a 3D eye pupil position of the wearer is provided in a reference frame, for instance a reference frame linked to the head-mounted device 10. The reference frame may be linked to the frame 14 of the head-mounted device 10. The 3D eye pupil position corresponds to a predetermined gaze direction, preferably a gaze direction defined or measured by/on the wearer to correspond to the direction used when visualizing the virtual image.

In the sense of the disclosure, the eye pupil 8 is to be understood as the entrance pupil of the eye of the wearer and may be represented as a disk. The 3D position of the eye pupil 8 may be understood as the 3D position of the disk, or as the 3D position of a point such as the center of the disk.

Advantageously, the 3D eye pupil position of the wearer is known in the same reference frame as the position of the eye motion box or of the focus area.

During customizing S8 the head-mounted device, the head-mounted device 10 is customized based on the 3D eye pupil position so that the position of the focus area (EMB) at least partly coincides with the position of the eye pupil 8 in the predetermined gaze direction.

Advantageously, the head-mounted device 10 is customized to the needs of the wearer, and the information intended to be viewed by the wearer is effectively directed towards the eye pupil 8 of the wearer.

The predetermined gaze direction may correspond to a specific vision task. For example, the wearer may be prompted to watch at an object in a known position, corresponding to the predetermined gaze direction. The predetermined gaze direction may correspond to an initialized value or a default value.

In the sense of the disclosure "the position of the focus area (EMB) at least partly coincides with the position of the eye pupil 8" is to be understood as both positions overlapping so that the full information contained in the light beam and intended to be viewed by the wearer is directed through the entrance pupil of the eye of the wearer.

During customizing S8 the head-mounted device, a reflective element 20 configured to receive and redirect the light beam reflected by the scanning element 18 toward the focus area (EMB) may be added to the head-mounted device 10. The reflective element 20 may be integrated to an optical lens 12 of the head-mounted device 10.

During customizing S8 the head-mounted device, at least one of the light source 16, the scanning element 18 and/or the reflective element may be adapted based on the provided 3D eye pupil position. This adaptation may involve adjusting the position and/or the orientation of the light source 16, the scanning element 18 and/or the reflective element 20 so as to direct the light beam towards the eye pupil 8 of the wearer.

During customizing S8 the head-mounted device, a holographic mirror may be recorded based on the provided 3D eye pupil position.

A light source may be positioned and adjusted to emit a registering beam to record the holographic mirror, such that after the holographic minor is recorded, the registering beam is reflected by the holographic minor and the reflected registering beam converges towards the focus area (EMB).

Advantageously, the method allows customizing a standard head mounted device 10 to a wearer by recording a holographic minor adapted to a specific wearer.

Figure 4:
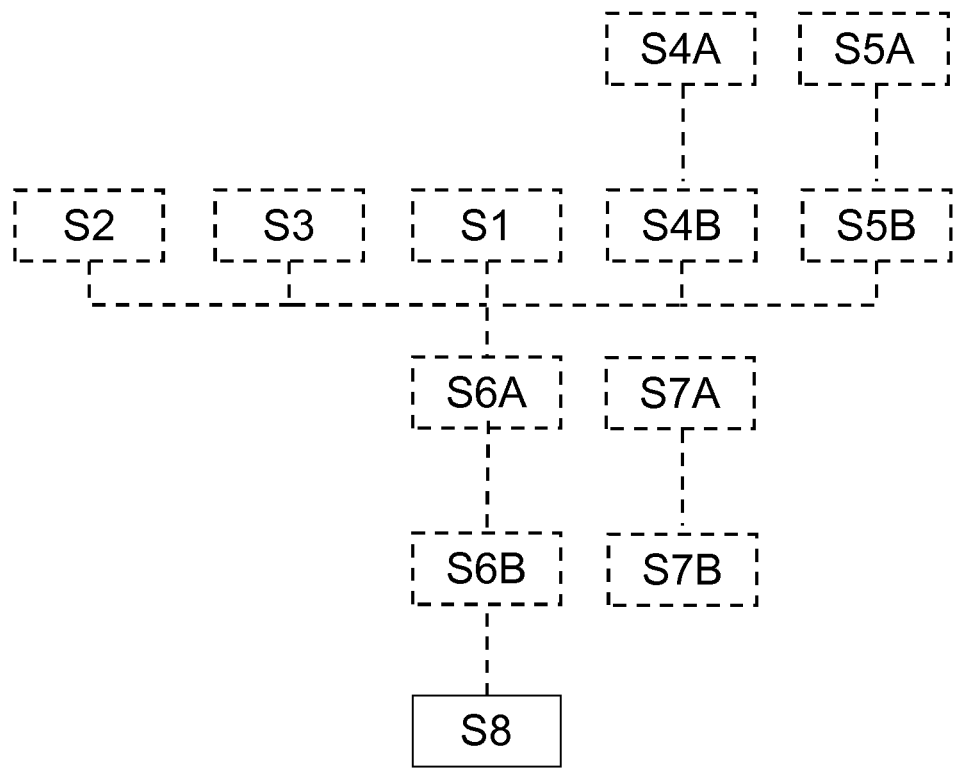
FIG. 4 is a flowchart of different steps of a method for customizing a head mounted device according to an embodiment of the invention.

As illustrated on FIG. 4, the method may further comprise, after providing S1 the head-mounted device, positioning S2 the head-mounted device on the wearer. The head-mounted device 10 may be adjusted to the face of the wearer.

Advantageously, the head-mounted device 10 is positioned in an optimal position for the wearer, thus improving the comfort of the wearer.

Another advantage provided by positioning S2 the head-mounted device is allowing determining directly the 3D eye pupil position of the wearer with respect to the worn head-mounted device 10.

As illustrated on FIG. 4, the method may further comprise, prior to obtaining S6A and/or providing S6B the 3D eye pupil position, determining S3 the 3D eye pupil position in a frame of reference, for instance in a frame of reference linked to the head-mounted device 10.

During determining S3 the 3D eye pupil position, the 3D position of the eye pupil 8 with respect to the head-mounted device 10 may be directly measured. For example, position measurements may be performed directly on the wearer after positioning the head-mounted device on the wearer during positioning S2 the head-mounted device.

Alternately, the 3D position of the eye pupil 8 may be calculated from measurements or models. Such models may include superimposing a virtual image of the head-mounted device on the face of the wearer, or on an image of the face of the wearer, preferably according to a predetermined usage of the wearer.

Such measurements or models may comprise a distance between a major surface of the optical lens 12 and the eye of the wearer, and/or a distance between a major surface of the optical lens 12 and the center of rotation 9 of the eye of the wearer, and/or a pantoscopic angle and/or a wrap angle.

The pantoscopic angle is the angle in the vertical plane between the optical axis of the spectacle lens and the visual axis of the eye in the primary position, usually taken to be the horizontal.

The wrap angle is the angle in the horizontal plane between the optical axis of the spectacle lens and the visual axis of the eye in the primary position, usually taken to be the horizontal.

Instead of using a measurement device dedicated for determining a 3D position of the pupil, it is possible to use a device adapted for determining a 2D position of the pupil, and perform successive iterations of position determination.

An example of a suitable device is described in EP 2134249 and comprises a 2D camera and a clip having marks attached to the eyewear.

The clip defines a frame of reference (Of,Xf,Yf,Zf) linked to the eyewear. A measurement of a pupil position on two images with two different head postures and the same gazing direction facing the camera, enables determining the position of the eye rotation center in the defined frame of reference.

From the position of the eye rotation center in this frame of reference (Of,Xf,Yf,Zf), it is possible to derive a position of the pupil in this frame of reference (Of,Xf,Yf,Zf) corresponding to any gazing direction.

As illustrated on FIG. 4, the method may further comprise obtaining S4A and/or providing S4B at least one fitting parameter.

A fitting parameter may comprise a parameter related to the position of the frame 14 with respect to the face of the wearer when worn.

Figure 6:
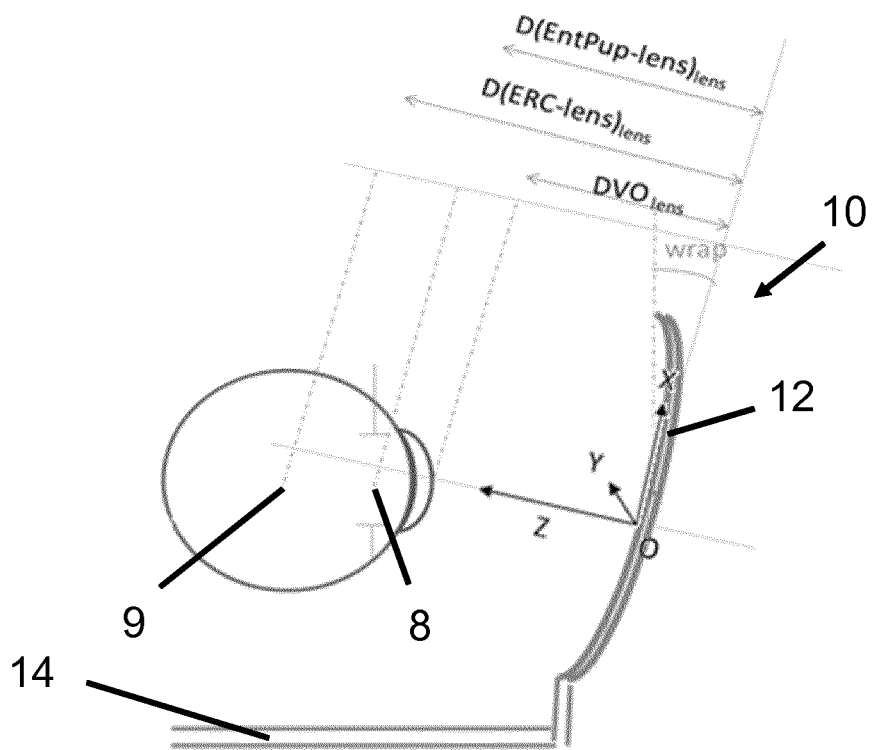
FIG. 6 is a schematic representation of a worn head-mounted device according to an embodiment of the invention, with measurements and parameters represented in a frame of reference linked to an optical lens of the head-mounted device.
Figure 7:
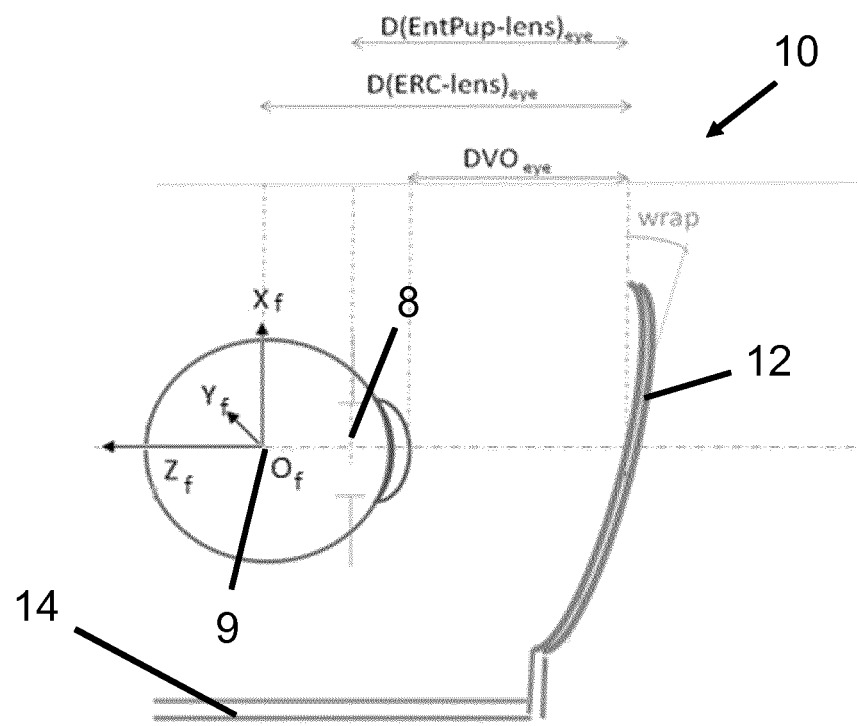
FIG. 7 is a schematic representation of a worn head-mounted device according to an embodiment of the invention, with measurements and parameters represented in a frame of reference linked to an eye of the wearer.

As illustrated on FIGS. 6 and 7, a fitting parameter may comprise a distance DVO corresponding to the distance between an optical lens of the head-mounted device and the cornea apex of the eye of the wearer.

A fitting parameter may comprise a distance D(ERC-lens) corresponding to the distance between the eye rotation center 9 and the eyeball-side surface of the optical lens of the head-mounted device.

A fitting parameter may comprise a distance D(EntPup-lens) corresponding to the distance between the eye pupil 8 and the eyeball-side surface of the optical lens of the head-mounted device.

The at least one fitting parameter can be characterized by the position of an optical lens of the head-mounted device in a reference frame linked to the worn head-mounted device along two horizontal axis (X and Z on FIG. 1).

The at least one fitting parameter can be characterized by the position of an optical lens of the head-mounted device may be determined in a reference frame linked to the worn head-mounted device along two horizontal axis (X and Z on FIG. 1).

Advantageously, the position of the focus area (EMB) in a reference frame linked to the worn head-mounted device may be determined with increased precision along said two horizontal axis, thus achieving better coincidence between the focus area (EMB) and the eye pupil 8.

As illustrated on FIG. 4, the method may further comprise obtaining S5A and/or providing S5B at least one centering parameter.

A centering parameter may comprise a parameter related to the position of optical lenses 12 or ophthalmic lenses of the head-mounted device 10 with respect to the face of the wearer.

A centering parameter may comprise the distance ½PD between the middle of the nose and the eye pupil and/or the fitting height FH corresponding to the distance between the pupil and the lower edge of the frame.

This position can be characterized by the position of an optical lens in a reference frame linked to the worn head-mounted device along an horizontal axis (X on FIG. 1), and a vertical axis (Y on FIG. 1).

As illustrated on FIGS. 6 and 7, any measurement and/or model and/or fitting parameter and/or centering parameter obtained and/or provided by the method may be determined directly in a reference frame, for instance in a reference frame linked to the head-mounted device, corresponding to an (0, X, Y, Z) axis system on FIG. 6.

Alternately, the measurements, models and parameters may be first provided in a reference frame linked to the eye of the wearer, corresponding to an (0, Xf, Yf, Zf) axis system on FIG. 7 and subsequently converted in a reference frame linked to the head-mounted device.

Moreover, during obtaining S6A and/or providing S6B the 3D eye pupil position, the 3D eye pupil position may be determined based on the at least one fitting parameter and/or the at least one centering parameter.

Advantageously, the method allows customizing the head-mounted device 10 to wearing conditions corresponding to a better wearing comfort, an improved visual comfort and best visual correction for the wearer.

As illustrated on FIG. 4, the method may further comprise obtaining S7A and/or providing S7B at least one configuration parameter value of the head-mounted device 10 related to the position of the focus area in a reference frame, for instance in a reference frame linked to the head-mounted device 10.

Such configuration parameter may comprise a position and/or an orientation and/or a state of activation of the light source 16, the scanning element 18 and/or the reflective element 20 so as to direct the light beam towards the eye pupil 8 of the wearer.

Moreover, during customizing S8 the head-mounted device, the at least one configuration parameter may be customized and updated based on the provided 3D eye pupil position.

Advantageously, the method allows customizing a single head-mounted device 10 for different wearers, different wearing conditions, or different visual tasks implying different gaze directions.

An additional advantage of the method is allowing storing configuration parameters adapted to a specific wearer of a head-mounted device 10 under specific wearing conditions, so that these configuration parameters may be subsequently retrieved and applied to the head-mounted device 10.

In an embodiment, obtaining S6A and/or providing S6B the 3D eye pupil position and the head-mounted device customizing step S8 are repeated over time.

Advantageously, the head-mounted device 10 may be adapted to varying needs of the wearer.

Figure 5:
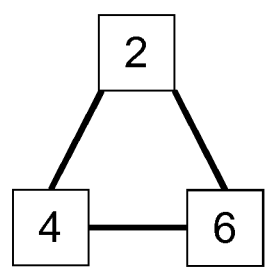
FIG. 5 is a schematic representation of a device for determining the relative position of a head-mounted device and of an eye pupil of the wearer according to the invention.

As illustrated on FIG. 5, the invention further relates to a device for determining the relative position of a head-mounted device 10 configured to direct a light beam towards a focus area (EMB) and of an eye pupil 8 of the wearer, the device comprising at least one position sensor 2, a memory 4 and a processing unit 6, each communicating with one another.

In the sense of the disclosure, the sensor 2 the memory 4 and the processing unit 6 each communicating with one another is to be understood as either wired or wireless communication.

In embodiments, the processing unit 6 may for example be part of a remote computing system.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Wireless standards (e.g., RFID), short-range communications (e.g., Bluetooth, WiFi, Zigbee), and long-range communications (e.g., WiMAX, GSM, CDMA) are contemplated for use by the device for determining the relative position of a head-mounted device 10 and of an eye pupil 8 of the wearer.

The at least one position sensor 2 is adapted to determine position data in a given frame of reference. The position data comprise at least the 3D position of the eye pupil 8 when the wearer wears the head-mounted device 10 and the 3D position of at least part of the head-mounted device 10 when the wearer wears the head-mounted device 10.

The memory 4 is adapted to store the position data determined by the at least one position sensor 2.

The processing unit 6 is adapted for determining the 3D position of the eye pupil 8 in a reference frame linked to the head-mounted device 10 based on the position data stored on the memory.

Advantageously, the device allows determining the 3D position of the eye pupil 8 of the wearer in a reference frame linked to the head-mounted device 10.

In embodiments, the memory 4 may also comprise instructions for customizing the head-mounted device 10 based on the determined 3D position of the eye pupil 8 of the wearer.

Advantageously, the device allows customizing the head-mounted device 10 based on the 3D eye pupil position of the wearer.

The device for determining the relative position of a head-mounted device 10 may itself comprise the head mounted device 10. For example, the position sensor 2 may be adapted to determine the position of the eye pupil 8 of the wearer relatively to its own position on the head mounted device 10.

Advantageously, the position sensor 2 has a fixed position in the reference frame linked to the head-mounted device 10, resulting in one less source of error in determining the 3D position of the eye pupil 8 of the wearer.

The head-mounted device 10 may comprise a light source 16 configured to emit a light beam and a scanning element 18 configured to receive the light beam and to reflect the received light beam.

The head-mounted device 10 may comprise a reflective element 20 configured to receive and redirect the light beam reflected by the scanning element 18 toward the focus area (EMB).

In embodiments, the position data determined by the position sensor 2 and stored on the memory 4 may comprise the position and/or the orientation of the light source 16, of the scanning element 18 and/or of the reflective element 20.

In embodiments, the memory 4 also comprises at least one stored configuration parameter value of the head-mounted device 10, related to the position of the focus area in a reference frame linked to the head-mounted device 10. Such configuration parameter may comprise a position and/or an orientation and/or a state of activation of the light source 16, the scanning element 18 and/or the reflective element 20 so as to direct the light beam towards the eye pupil 8 of the wearer.

In embodiments, the memory 4 may comprise instructions for customizing the position and/or the orientation and/or the state of activation of the light source 16, of the scanning element 18 and/or of the reflective element 20, and/or means for recording a holographic mirror based on the data stored in the memory 4.

Advantageously, the device allows performing a customization of the head-mounted device 10 by customizing and updating at least one configuration parameter.

Another object of the invention is a computer program product comprising one or more stored sequences of instructions that are accessible to a processor and which, when executed by the processor, causes the processor to carry out the steps of the method for customizing a head mounted device according to the invention.

Another object of the invention is a computer readable medium carrying one or more sequences of instructions of the computer program product according to the invention.

Another object of the invention is a program which makes a computer execute at least the method for customizing a head mounted device of the invention.

Another object of the invention is a computer-readable storage medium having a program recorded thereon; where the program makes the computer execute at least the method for customizing a head mounted device of the invention.

Another object of the invention is a device comprising a processor adapted to store one or more sequence of instructions and to carry out at least one of the steps of the method according to the invention.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for customizing a head-mounted device adapted to generate a virtual image for a wearer, the method comprising:
    obtaining a 3D eye pupil position of the wearer in a reference frame and corresponding to a predetermined gaze direction; and
    customizing the head-mounted device based on the 3D eye pupil position so that the position of a focus area (EMB) at least partly coincides with the position of the eye pupil in the predetermined gaze direction,
    wherein customizing the head-mounted device comprises controlling a recording of a holographic mirror based on the 3D eye pupil position in the reference frame.

2. The method according to claim 1, wherein the 3D eye pupil position is obtained in a reference frame linked to the head-mounted device.

3. The method according to claim 1, wherein the method further comprises, prior to obtaining the 3D eye pupil position, determining the 3D eye pupil position in a reference frame linked to the head-mounted device.

4. The method according to claim 1, wherein the customized head mounted device comprises a light source configured to emit a light beam and a reflective element configured to receive and redirect the light beam towards the focus area (EMB), the reflective element comprising the holographic minor.

5. The method according to claim 4, wherein the head-mounted device comprises a scanning element configured to receive the light beam and to scan the received light beam towards the reflective element.

6. The method according to claim 1, wherein during customizing the head-mounted device, at least one of a light source, a scanning element and/or a reflective element is adapted based on the 3D eye pupil position in the reference frame.

7. The method according to claim 1, wherein during customizing the head-mounted device, a position and/or an orientation of at least one of a light source, a scanning element and a reflective element is adjusted based on the 3D eye pupil position in the reference frame.

8. The method according to claim 1, further comprising obtaining at least one fitting parameter, and wherein the 3D eye pupil position is determined based on the at least one fitting parameter.

9. The method according to claim 1, further comprising obtaining at least one centering parameter, and wherein the 3D eye pupil position is determined based on the at least one centering parameter.

10. The method according to claim 1, further comprising, prior to customizing the head mounted device:
    obtaining at least one configuration parameter value of the head-mounted device related to the position of the focus area in a reference frame, wherein during customizing the head-mounted device, the at least one configuration parameter is customized and updated based on the obtained 3D eye pupil position.

11. The method according to claim 1, wherein obtaining a 3D eye pupil position and customizing the head-mounted device based on the obtained 3D eye pupil position are repeated over time.

12. A device for customizing a head-mounted device adapted to generate a virtual image for a wearer, the head-mounted device including a light source configured to emit a light beam and a reflective element configured to receive and redirect the light beam towards a focus area, and a scanning element configured to receive the light beam and to scan the received light beam towards the reflective element, the device comprising:
   at least a memory and at least one processing circuit communicating with each other,
   wherein the memory is adapted to store position data comprising a 3D position of at least one eye pupil when the wearer wears the head-mounted device and a 3D position of at least part of the head-mounted device when the wearer wears the head-mounted device,
   wherein the at least one processing circuit is adapted for determining a 3D eye pupil position of the wearer in a reference frame based on the position data stored on the memory,
   the at least one processing circuit is adapted for determining data for customizing the head mounted device based on the 3D eye pupil position of the wearer so that a position of the focus area at least partly coincides with the 3D eye pupil position, and
   wherein the data for customizing is configured for the scanning element and/or the reflective element to be adapted based on the 3D eye pupil position in the reference frame.

13. A head-mounted device configured to direct the light beam towards the focus area (EMB), the head-mounted device comprising:
   the light source configured to emit the light beam and the reflective element configured to receive and redirect the light beam towards the focus area,
   the scanning element configured to receive the light beam and to scan the received light beam towards the reflective element, and
   a device according to claim 12 for customizing the head-mounted device.

14. A non-transitory computer readable medium comprising one or more stored sequences of instructions that are accessible to a processor and which, when executed by the processor, causes the processor to:
   obtain a 3D eye pupil position of a wearer in a reference frame and corresponding to a predetermined gaze direction,
   customize a head-mounted device based on the 3D eye pupil position of the wearer so that a position of a focus area (EMB) at least partly coincides with the 3D eye pupil position, and
   instruct recording of a holographic mirror based on the 3D eye pupil position in the reference frame.

\* \* \* \* \*